United States Patent [19]

Haidle et al.

[11] Patent Number: 4,909,582

[45] Date of Patent: Mar. 20, 1990

[54] METHOD AND APPARATUS FOR REMOVING A HELICAL WAVEGUIDE FROM A MANDREL

[75] Inventors: Rudy H. Haidle; Robert I. Altkorn, both of Evanston, Ill.

[73] Assignee: L'Air Liquide, Societe Anonyme Pour l'Etude et l'Exploitation des Procedés Georges Claude, Paris, France

[21] Appl. No.: 324,742

[22] Filed: Mar. 17, 1989

[51] Int. Cl.⁴ .............................................. G02B 6/00
[52] U.S. Cl. ............................... 350/96.1; 350/96.32; 242/54 R; 242/77.1
[58] Field of Search ............... 350/96.10, 96.29, 96.32; 242/54 R, 77.1, 78, 78.1

[56] References Cited

U.S. PATENT DOCUMENTS 1,956,398  4/1934  Nullmeyer ..................... 242/54 R
2,879,953  3/1959  Kramer et al. ................. 242/54 R
3,118,627  1/1964  Nelson et al. ................. 242/54 R
4,068,920  1/1978  Bass et al. .................... 350/96.32
4,194,808  3/1980  Marhic et al. ................. 350/96.32

*Primary Examiner*—John D. Lee
*Attorney, Agent, or Firm*—Oblon, Spivak, McClelland, Maier & Neustadt

[57] ABSTRACT

A method and apparatus for removing a waveguide from a mandrel. A helical waveguide is formed on a mandrel by electroplating. The mandrel has raised areas similar to a screw on which the waveguide is formed. A thin walled cylinder is slipped over the cylindrical mandrel and advanced axially as the mandrel rotates. A notch in the forward end of the cylinder acts to peel the waveguide from the mandrel. The cylinder then supports the waveguide in a helix as it continues to peel the remainder of the waveguide.

11 Claims, 1 Drawing Sheet

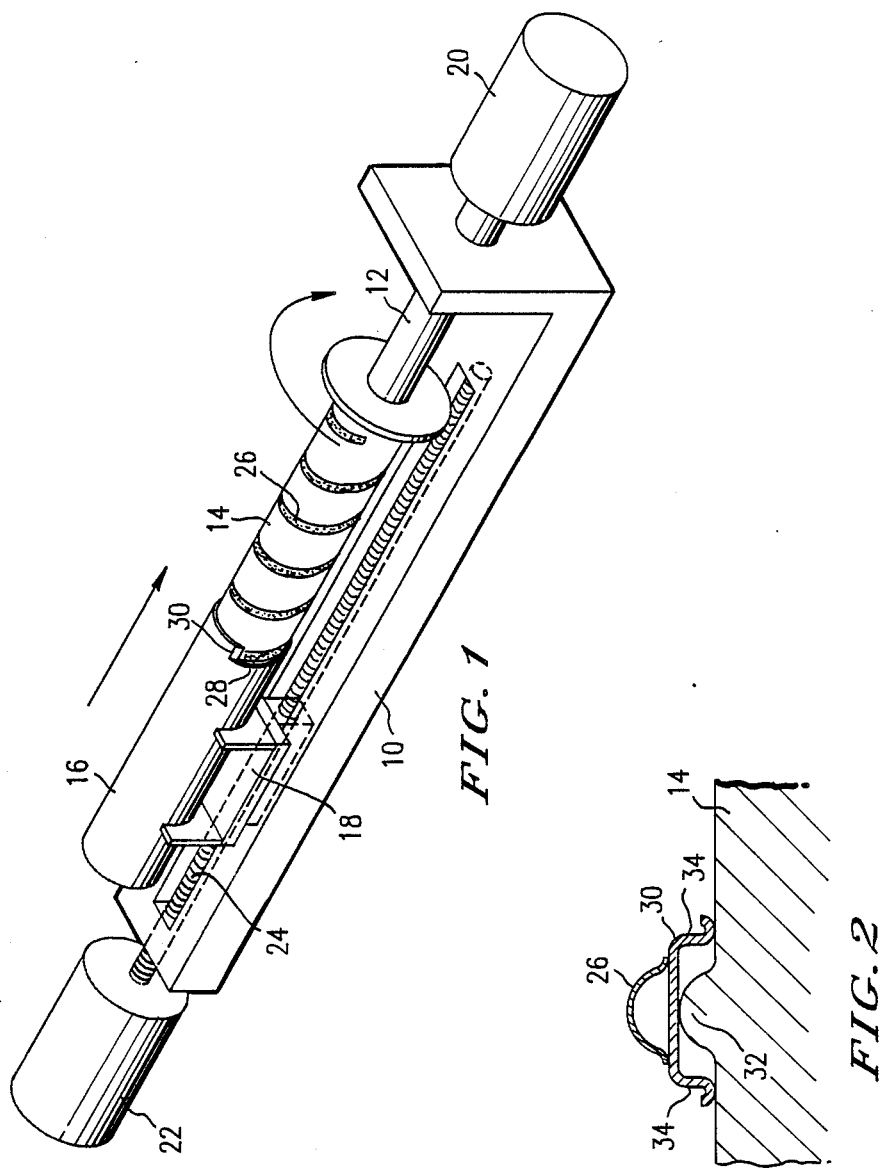

METHOD AND APPARATUS FOR REMOVING A HELICAL WAVEGUIDE FROM A MANDREL

BACKGROUND OF THE INVENTION

1. Field of the Invention:

The present invention relates generally to the removal of a waveguide from a mandrel and more particularly to the removal of an electroformed helical waveguide from a mandrel using a thin-walled cylinder.

2. Discussion of the Background:

Although the use of fiber optic waveguides has been known for visible light for some time, the use of such devices with infrared light has not been very successful. In particular, large losses occur when infrared light is used with fiber optic type waveguides. Other particular structures have been designed instead in order to carry this particular type of light.

One such type of waveguide is shown in U.S. Pat. No. 4,194,808. This device shows a surface wave transmission type waveguide which may be helically formed. The particular transmitting surface is a highly polished copper tube having a concave cross-section. Although this type of waveguide, known as a whispering-gallery waveguide has been successful in transmitting infrared light without major losses, the construction of these devices in the helical shape has been somewhat difficult.

In order to form the helix, the waveguides have been formed on a mandrel which may be reused. However, it has been difficult to remove the waveguide from the mandrel without damaging either the waveguide or the mandrel. In order to economically form waveguides of high quality, better methods of removing the waveguides from the mandrels are necessary.

SUMMARY OF THE INVENTION

Accordingly, one object of the present invention is to provide a method and apparatus for removing a waveguide from a mandrel which produces waveguides which are not damaged.

A second object of this invention is to provide a method and apparatus for removing a waveguide from a mandrel which is simple in operation and economical to build and operate.

A further object of this invention is to provide a method and apparatus for removing a waveguide from a mandrel which does not damage the mandrel so that it may be reused.

A still further object of this invention is to provide a method and apparatus for removing a waveguide from a mandrel which economically produces high quality waveguides without damaging the mandrel which may be used.

Briefly, these and other objects of the invention may be achieved by providing a thin-walled cylinder which peels the waveguide from the mandrel and supports the waveguide as it moves.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 1 is a perspective view of the present invention.

FIG. 2 is a cross-sectional view of part of the apparatus of FIG. 1.

DETAILED DESCRIPTION OF THE PREFERRED EMBODIMENTS

Various other objects, features and attendant advantages of the present invention will be more fully appreciated as the same becomes better understood from the following detailed description when considered in connection with the accompanying drawings in which like reference characters designate like or corresponding parts throughout the several views and wherein FIG. 1 shows the overall arrangement of the invention including base 10 for holding the apparatus. The base supports shaft 12 which is mounted for rotation. The shaft supports one end of mandrel 14 so that the mandrel rotates along with the shaft. Although the specific means for connection is not shown, the mandrel may be partially hollowed out to receive the end of the shaft. The other end of the mandrel is received on the cylinder 16. This cylinder is mounted on a carriage 18 which is allowed to move along base 10. Motor 20 is connected to shaft 12 to rotate the cylinder in the circumferential direction as indicated by the arrow. At the same time, motor 22 is used to move carriage 18 along the cylinder 16 in an axial direction indicated by the arrow. The carriage may be moved by a drive screw 24 or any other similar apparatus.

It would also be possible to use a single motor to drive both the carriage 18 and shaft 12 by employing an appropriate transmission to achieve the proper rotational speeds. In place of the motors, it is also possible to move the cylinder by hand by having the carriage being freely movable and rotating the rear end of the cylinder as it is pushed forward.

The mandrel has formed thereon a waveguide 26. This waveguide is formed in a helix on the surface of the mandrel. Although the mandrel could be a smooth walled cylinder, preferably it has raised portions formed therein in the manner of a screw, with the waveguide being formed on top of the raised portions. In doing this, the formed waveguide has a concave portion which is used as the surface wave transmission part of the waveguide. The waveguide may be formed by any number of different methods which are available for forming thin objects, such as electroplating, vapor deposition and other similar methods. However, the preferred embodiment is to form the waveguide by electroplating a metal such as nickel using traditional electroplating methods.

The cylinder includes a notch at its forward end having a circumferential portion 28 extending back from the end of the cylinder at an angle at least equal to the pitch angle of the helix. The notch also includes a connecting end 30 which is aligned in the axial direction and is used to remove the waveguide from the mandrel.

In operation, the two motors are controlled to drive the mandrel and cylinder together so as to duplicate the pitch of the helix. To start the removing process, it may be necessary to peel by hand the end of the helix and place it on the connecting end 30 of the cylinder. As the relative rotation of the cylinder and mandrel then continues, the waveguide is slowly and automatically peeled from the surface and lifted up onto the cylinder. Since the cylinder has only a slightly greater diameter than that of the mandrel, the waveguide will follow the cylinder around so as to be supported by the cylinder in a similar helix fashion. When the waveguide is completely removed the cylinder may be removed from the mandrel and the waveguide then removed from the cylinder.

The connecting end 30 may be merely a blunt portion of the cylinder wall if the wall is thin enough. Preferably, however, this is sloped slightly so as to form a knife edge to aid in the removal of the waveguide.

The cylinder 16 is shown as supported at its midsection by carriage 18. The cylinder may also be supported at its rear end if the carriage is designed so as to firmly hold the cylinder from the end. If the carriage carries the cylinder in the middle as is currently shown, the cylinder must be considerably longer than the mandrel since enough space must be present between the forward end of the cylinder and the carriage so that the helix may be stored thereon without hitting the carriage.

FIG. 2 shows a cross-sectional view of the mandrel, cylinder and waveguide where the view is taken looking at a point just behind the connecting end 30. Thus, FIG. 2 shows mandrel 14 on the bottom with connecting end 30 of the cylinder riding over the mandrel and with the waveguide 26 resting on top of the connecting end. Thus, at this location the waveguide has just been removed from the mandrel and rests on top of the cylinder immediately behind the connecting end.

As mentioned earlier, the mandrel is preferably formed with raised portions shown as 32 in FIG. 2. Due to these raised portions, the formed waveguides 26 have a concave inner surface which is the right shape to carry the surface waves of the transmitted infrared light.

In the preferred embodiment, the connecting end of the cylinder is formed to have two descending legs 34 which contact the mandrel on either side of the raised portion 32. As a result of this, neither the raised portions 32 which are used to form the waveguide nor the important concave surface of the waveguide itself comes into contact with the connecting end. That is, no wear on the moving parts will occur between the raised portions which are not critical to the formation of the waveguide.

It would also be possible to form the cylinder with a smooth inner surface and without the legs 34 and allow the cylinder merely to rest on the top of the raised portions. However, some wear will occur the raised portions if this occurs. It also would be possible to cut a groove on the internal surface of the cylinder having the same pitch as the raised portions 32 so that the cylinder would screw directly onto the mandrel. This would allow the cylinder and mandrel to fit closely together to avoid any rocking motion or "play" therebetween. Also, this would possibly allow the apparatus to be driven by a single motor since the cylinder would follow the mandrel in the axial direction along with the movement in the circumferential direction caused by the motor. Thus, the synchronization control of the two motors would be avoided.

Obviously, numerous modifications and variations of the present invention are possible in light of the above teachings. It is therefore to be understood that within the scope of the appended claims, the invention may be practiced otherwise than as specifically described herein.

What is new and desired to be secured by Letters Patent of the United States is:

1. An apparatus for removing a helically formed waveguide from a mandrel comprising:
    means for supporting said mandrel for rotation in the circumferential direction;
    waveguide receiving means having an inner surface for receiving said mandrel and an outer surface for receiving said waveguide after separation of the waveguide from the mandrel, said waveguide receiving means being relatively thin between the inner and outer surfaces;
    said waveguide receiving means having an edge for removing the waveguide from the mandrel and placing the waveguide on the waveguide receiving means.

2. The apparatus according to claim 1, further comprising means for moving said mandrel circumferentially and said waveguide receiving means axially at the same time to approximate the pitch of the helix.

3. The apparatus of claim 2, wherein said means for moving includes at least one motor for driving the mandrel circumferentially.

4. The apparatus according to claim 3, wherein the means for moving includes a second motor for moving said waveguide receiving means axially.

5. The apparatus according to claim 1, wherein said waveguide receiving means is a thin walled cylinder.

6. The apparatus according to claim 1, wherein said mandrel includes raised sections arranged in a helix around the surface of the mandrel.

7. The apparatus according to claim 1, wherein the waveguide is formed from electroplated metal.

8. The apparatus according to claim 1, wherein said edge has legs extending downwardly to meet the surface of the mandrel.

9. The apparatus according to claim 1, wherein said edge extends in the direction of the axis of the mandrel.

10. A method for removing a helical waveguide from a mandrel, comprising the steps of supporting said mandrel for circumferential rotation;
    axially moving a waveguide removing means which receives said mandrel at its inner surface;
    providing an edge near the forward end of said waveguide removing means;
    removing the waveguide from the mandrel and placing it around the waveguide receiving means by the relative rotation of said edge and said mandrel.

11. A method according to claim 10, further comprising the steps of controlling a circumferential movement of the mandrel and an axial movement of the waveguide removing means so as to approximate the pitch of the helix.

* * * * *